United States Patent
Gow

(10) Patent No.: US 8,217,264 B2
(45) Date of Patent: Jul. 10, 2012

(54) ELECTRICAL OUTLET COVERING ACCESSORY MOVABLE BETWEEN POSITIONS CONCEALING AND ALLOWING ACCESS TO THE OUTLET

(76) Inventor: Thomas W. Gow, Elkton, SD (US)

( * ) Notice: Subject to any disclaimer, the term of this patent is extended or adjusted under 35 U.S.C. 154(b) by 270 days.

(21) Appl. No.: 12/762,664

(22) Filed: Apr. 19, 2010

(65) Prior Publication Data

US 2011/0061886 A1    Mar. 17, 2011

Related U.S. Application Data

(60) Provisional application No. 61/242,426, filed on Sep. 15, 2009.

(51) Int. Cl.
*H05K 5/03* (2006.01)

(52) U.S. Cl. ............. 174/67; 174/66; 439/135; 220/242

(58) Field of Classification Search ............... 174/66, 174/67; 220/241, 242; 439/135, 136; D8/353; D13/177
See application file for complete search history.

(56) References Cited

U.S. PATENT DOCUMENTS

| 4,102,466 A | * | 7/1978 | Jadatz | ............ 220/3.8 |
| 6,635,823 B2 | * | 10/2003 | Kasai et al. | ............ 174/66 |

\* cited by examiner

*Primary Examiner* — Dhirubhai R Patel
(74) *Attorney, Agent, or Firm* — Nawrocki, Rooney & Sivertson, P.A.

(57) ABSTRACT

An improved electrical outlet access control accessory mounts in a wall to provide access to and concealment for an outlet mounted in aligned juxtaposition thereto. The accessory has a cover that can be manually rotated between closed and open positions, providing respectively concealment for or access to an outlet within. When closed the cover is flush or nearly so, with the surrounding wall. A retention mechanism holds the cover in the closed position until manually pressed inwards, after which the cover is rotatable to the open position.

11 Claims, 8 Drawing Sheets

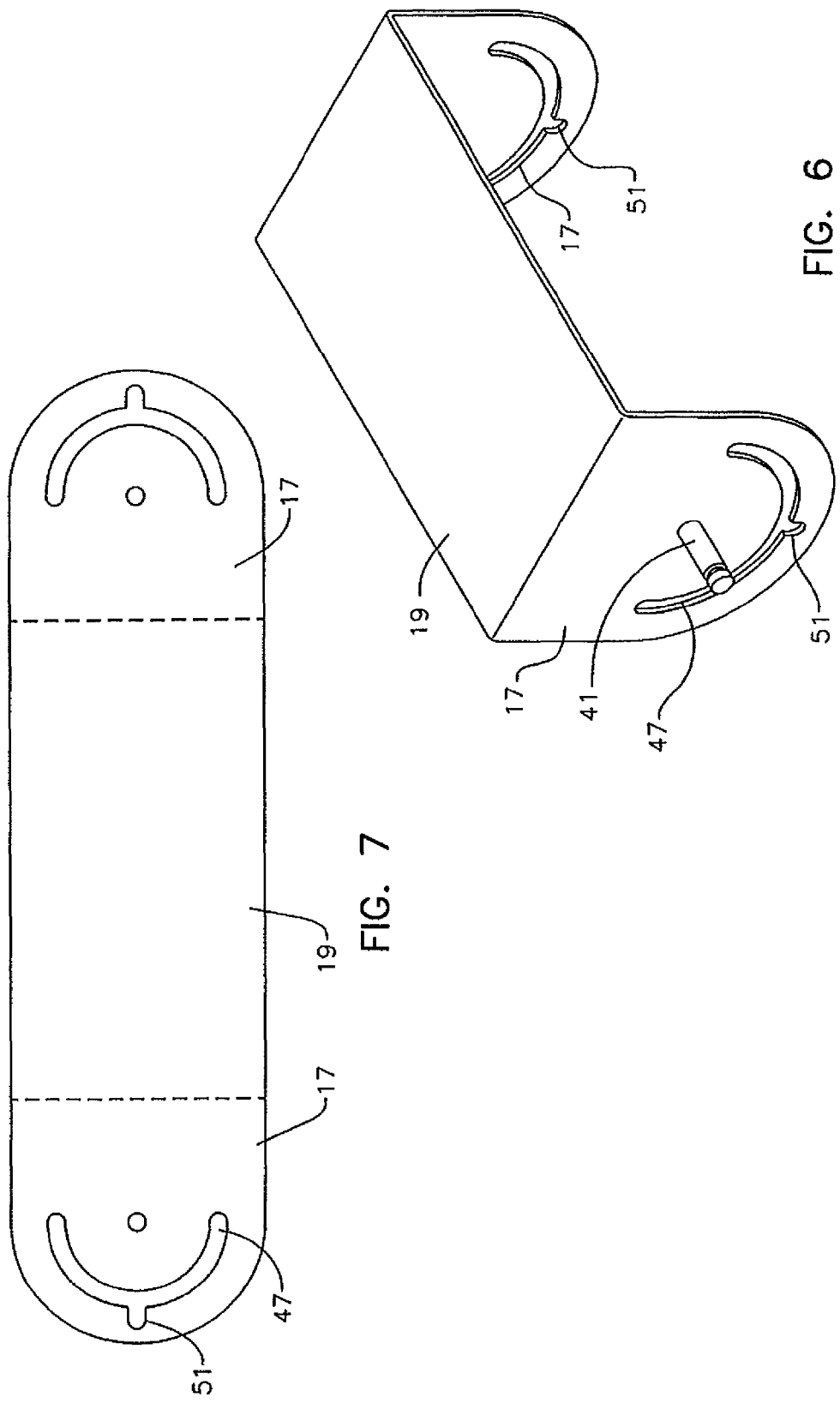

ELECTRICAL OUTLET COVERING ACCESSORY MOVABLE BETWEEN POSITIONS CONCEALING AND ALLOWING ACCESS TO THE OUTLET

This is a regular application filed under 35 U.S.C. §111(a) claiming priority under 35 U.S.C. §119(e)(1) of provisional application Ser. No. 61/242,426, having a filing date of Sep. 15, 2009, filed under 35 U.S.C. §111(b).

BACKGROUND OF THE INVENTION

The 110 v. outlet or receptacle (often called "duplex" because it has jacks for two two- or three-pronged plugs) is a staple of modern American living, found on walls in nearly every occupied space. Nearly every 110 v. AC portable electrical device is designed to temporarily plug into a duplex outlet for power. Outlets are typically wall-mounted, with the outlet and a surrounding cover plate projecting slightly from the surrounding surface.

For safety purposes, electrical codes require specific installation formats for duplex outlets. Without exception, every duplex outlet must be mounted in an electrical box that is firmly attached to a part of the building structure such as wallboard or a stud, and within the space between studs or, less frequently, joists. Wiring led through the spaces between studs or joists enters the electrical boxes through holes provided therein and connects to terminals of the outlets.

The electrical box serves to anchor the outlet to the building structure and provides a mechanical barrier between the connections to the outlet and nearby combustibles. Experience shows that many electrical problems arise in the connections between the outlet and the electrical wiring. Placing these connections within an electrical box will often prevent heat generated by a faulty wiring connection from starting a fire. It also prevents mechanical damage to the connection and the outlet.

The most common type of duplex outlet has two mounting holes spaced approximately 3¼ in. apart. Electrical boxes have a mounting hole on each two facing walls, spaced to mate with the outlet mounting holes. The electrical box mounting holes receive threaded machine screws that pass through the outlet mounting holes to firmly affix the outlet to the box. Other types of outlet mounting are sometimes used as well.

Other types of electrical connectors such as telephone and Ethernet jacks and coaxial cable terminations also have a mounting format compatible with standard electrical boxes. This provides a convenient way to anchor these connectors to the structure even if no safety issue is present for these low voltage connectors.

For purposes of generality, the intent is that the term "outlet" in this specification refers to all of these different kinds of signal and power voltage jacks and connectors.

In many ways, these standard outlets serve admirably. They are safe, have been standardized throughout the United States, and are relatively inexpensive. These outlets have a number of disadvantages however.

One problem with standard outlets is simply aesthetics. Their appearance is strictly utilitarian. Designer cover plates compensate poorly for this lack.

More importantly, standard power outlets provide a risk of physical harm to children, who may poke conducting objects into the hot terminal of such outlets. And in public spaces, standard receptacles may be vandalized. Further, exposed outlets may be inadvertently damaged during cleaning or when bumped by heavy objects.

Lastly, outlets on outside walls in colder climates may form a bypass that allows cold air to leak into the occupied space.

For all of these reasons standard outlets are not suitable for all locations.

BRIEF DESCRIPTION OF THE INVENTION

An improved electrical outlet access control accessory mounts in a wall to provide access to and concealment for an outlet mounted in aligned juxtaposition thereto. "Aligned juxtaposition" means that the outlet is visible and accessible through the access control accessory.

The accessory includes a housing having an internal space and an opening, both defined by first and second facing walls and third and fourth facing walls adjacent and attached to the first and second walls. At least the first wall has a first housing pivot spaced from the opening. A preferred embodiment has a housing pivot in each of the first and second walls.

A first arm sized to fit within the housing carries a cover sized to fit within the housing opening. The first arm is attached at a first end to the cover proximate an edge thereof. The first arm has an arm pivot spaced from the first end of the first arm, and attached for rotation to the first housing pivot.

This arrangement allows the first arm to rotate and to shift and carry the cover between an open position and a closed position, respectively allowing access to and concealing of the juxtaposed outlet. When closed the cover is nearly flush with the surrounding wall.

A preferred embodiment has first and second arms respectively engaging and pivoting on housing pivots on the first and second walls of the housing. In one preferred embodiment the arm pivot is an axle fixed to the first arm and that rotates in a hole in the first wall.

The first wall may include a detent feature and the first arm may include an engagement feature engaging the detent feature as the cover approaches the closed position. The detent and engagement features cooperate to form a retention mechanism that retains the cover in the closed position.

A particular type of retention mechanism has the hole in the first wall receiving the axle in the form of a slot through which the axle passes. In this embodiment the detent feature comprises a detent projection fixed in the first wall at a preselected spacing from the pivot point, and the engagement feature in the first arm comprises a circular slot and a notch. The circular slot has first and second edges with radii respectively larger and smaller than the preselected spacing and centered on the axle. The circular slot has the notch with a radial orientation in the first edge. A spring attached to the axle urges the notch toward a detent projection that opposes rotation of the arm.

BRIEF DESCRIPTION OF THE DRAWINGS

FIG. 6 is a perspective view of a unitary cover and pair of support arms.

FIG. 7 is an elevation view of a preliminary phase of sheet metal to be formed into a unitary cover and arms for supporting the cover.

DESCRIPTION OF THE PREFERRED EMBODIMENTS

Figure 1:
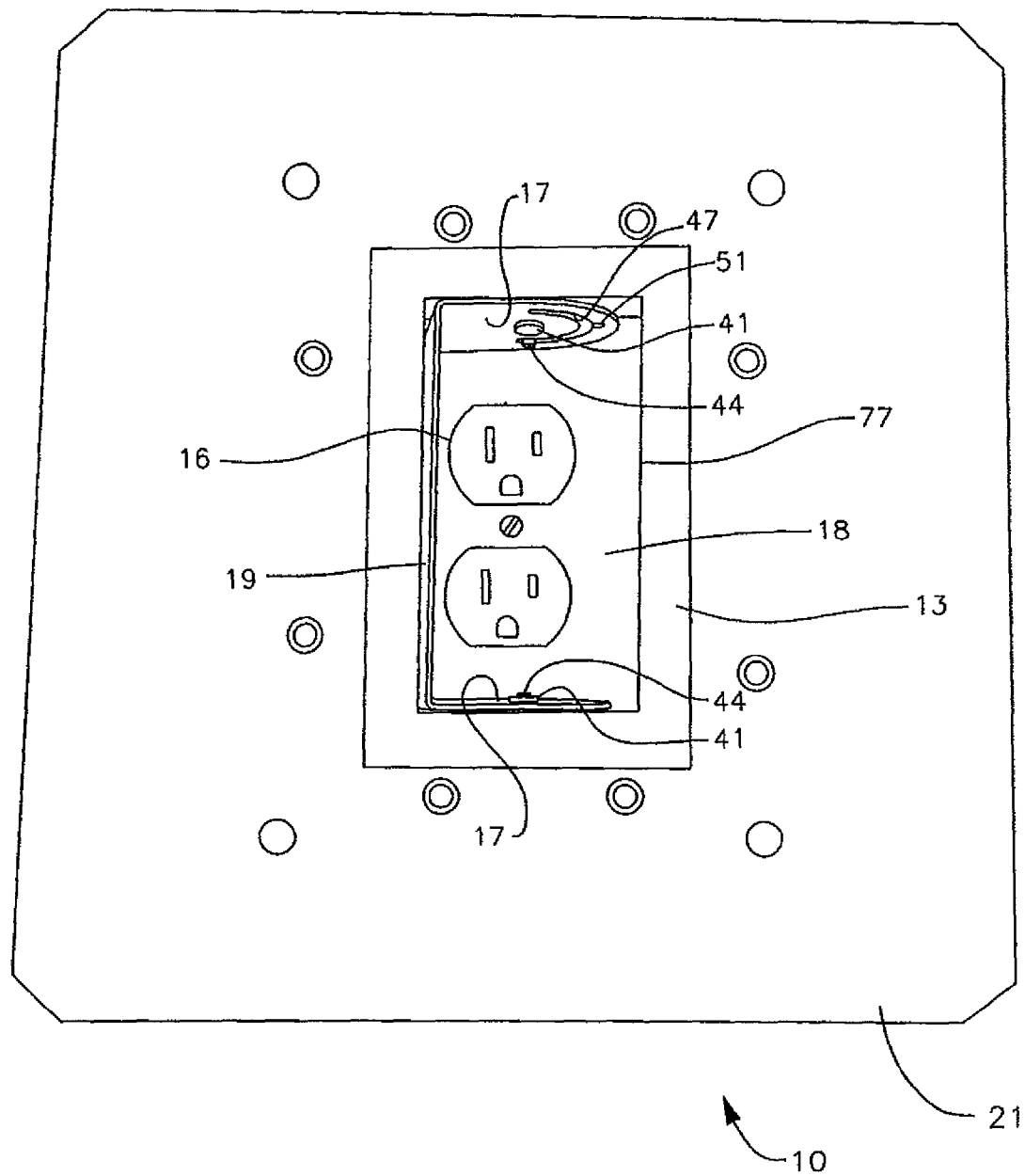
FIGS. 1-3 are front elevation views of the visible portions of an installed version of an outlet box covering accessory in respectively, open, partially open, and closed positions.
Figure 2:
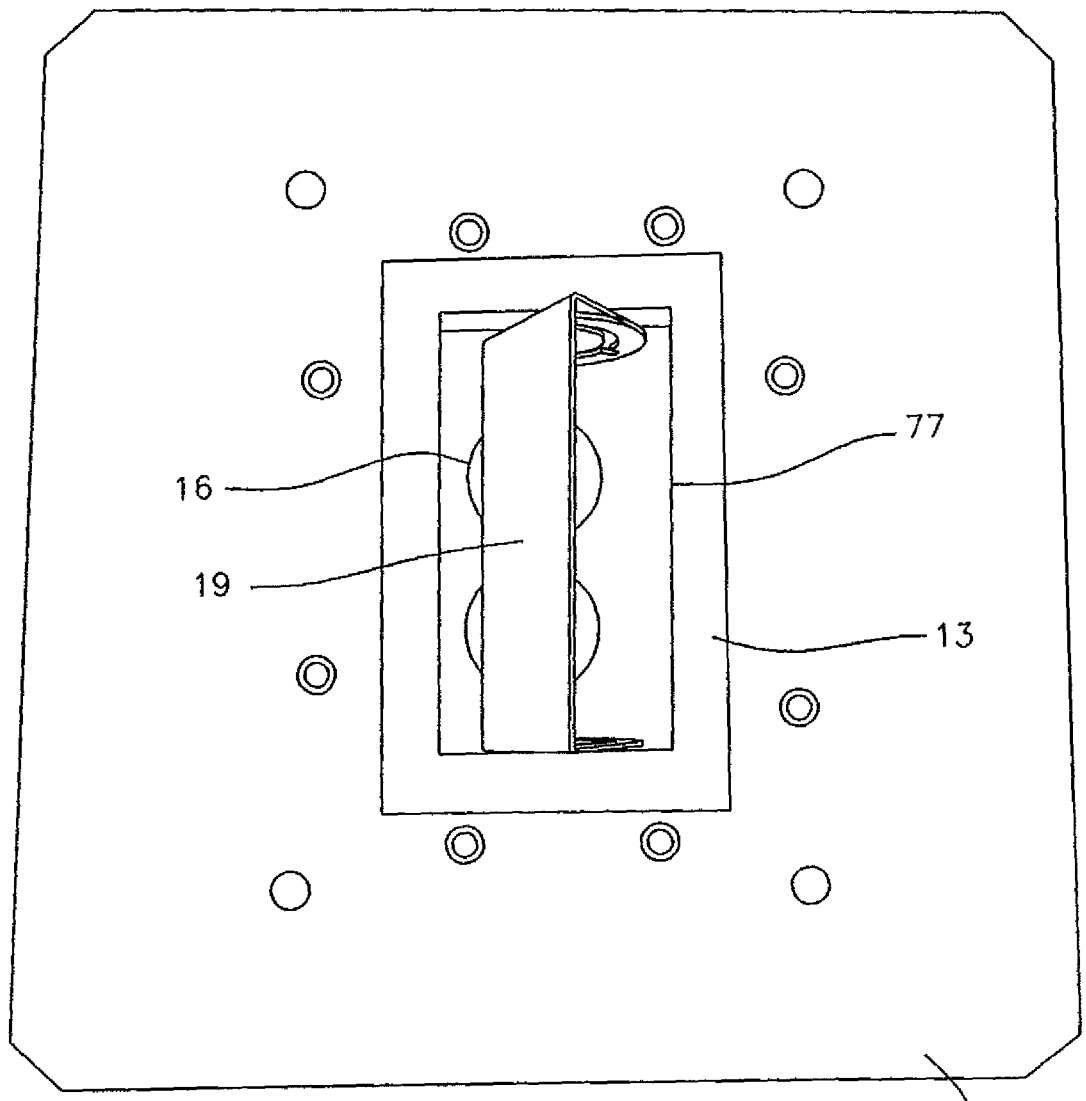
Figure 3:
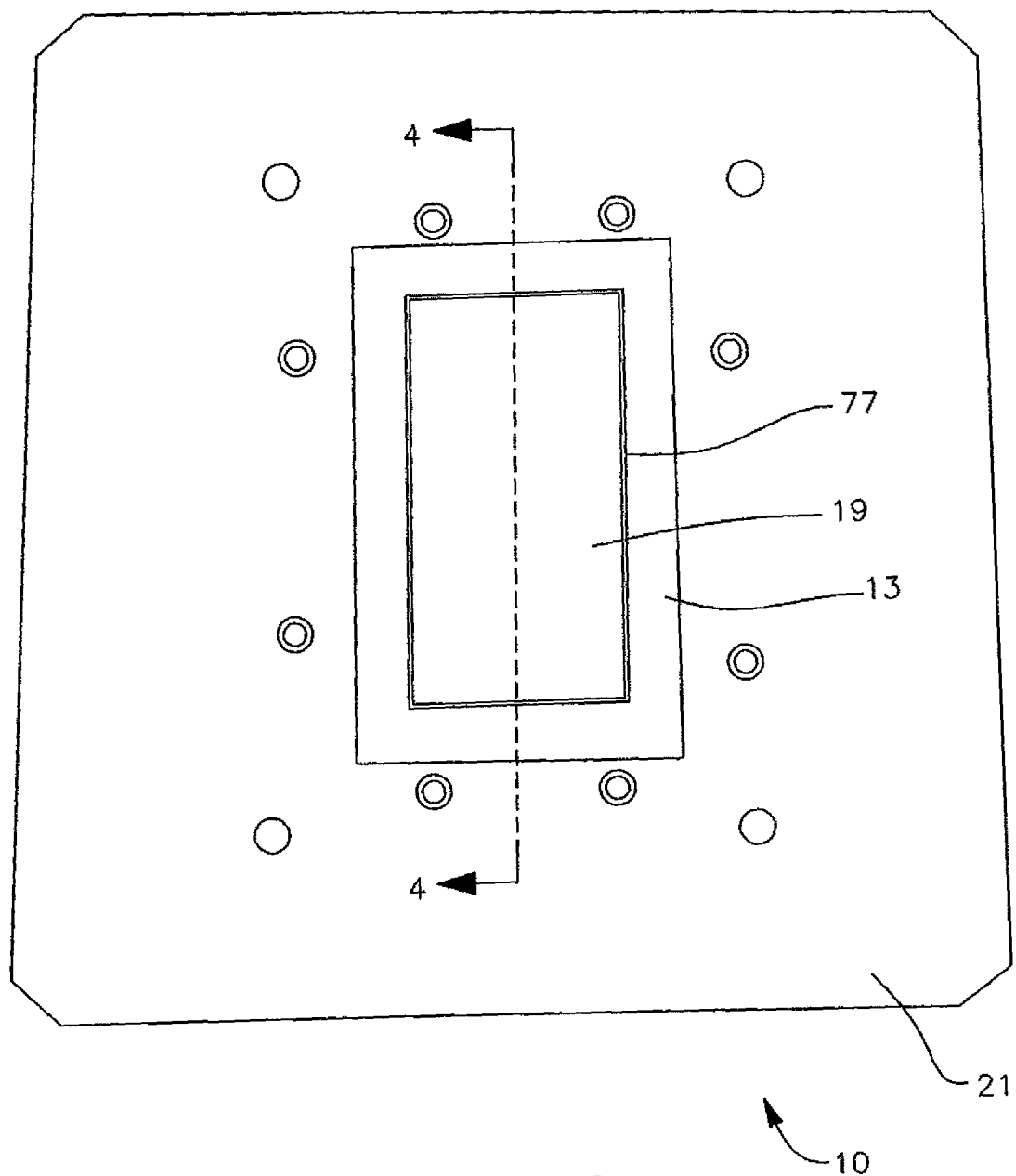

FIGS. 1-3 show the normally visible portions of a typical installation for this invention, which is an access control accessory 10 for an electrical outlet 16. FIGS. 1-3 show accessory 10 in respectively, open, partially open, and closed positions. A person manually changes the state or position of accessory 10 between open and closed.

Figure 4:
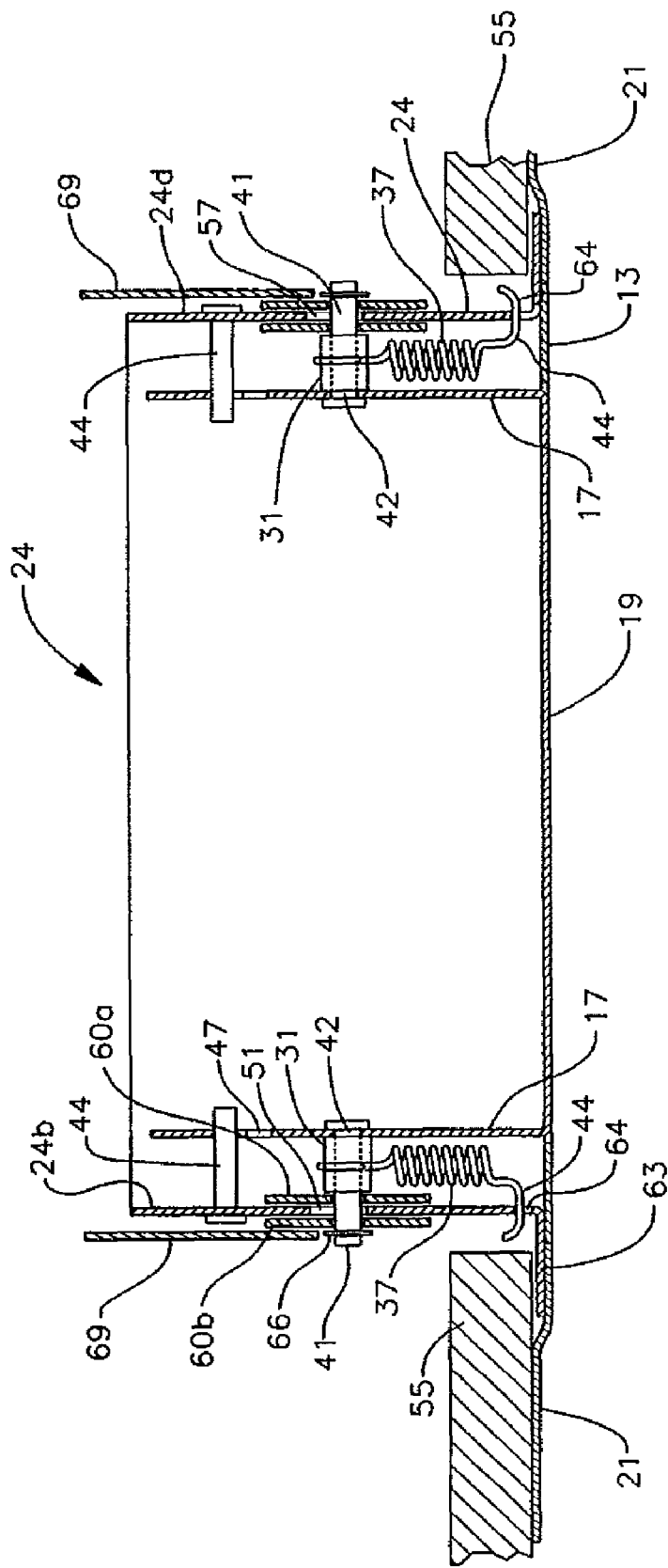
FIG. 4 is a sectional side elevation view taken along line 4-4 in FIG. 3 of a mechanism for guiding and supporting a movable cover for a recessed electrical outlet.

The phrase "access control" means that in the closed position or state, accessory 10 provides protection and concealment for an outlet 16 mounted in juxtaposition thereto, and in the open position allows access to outlet 16. "In juxtaposition thereto" means in most cases that accessory 10 is positioned within an opening in a wall or ceiling and aligned with an outlet 16 mounted on a structural member supporting the wall or ceiling. The alignment allows a person to reach through accessory 10 (and of course the wall or ceiling opening in which it's mounted) to access outlet 16. Outlet 16 is fastened to a structural element supporting wall 55 (FIG. 4).

As presently conceived, the accessory 10 includes a mounting plate 21 to be bonded to a wall 55 (see FIG. 4) comprising for example a material such as wallboard. A trim plate 13 frames and defines a first opening 77 allowing access to an outlet 16. As mentioned previously, the term "outlet" in this description should be read as including not only 110 v. duplex electrical receptacles, but also 220 v. outlets, Ethernet and telephone jacks, and coaxial cable connectors, as well as other possible types of connection elements typically installed in walls and ceilings.

FIG. 1 shows accessory 10 open to allow access to outlet 16. FIG. 2 shows accessory 10 partially open, with a cover or door 19 in transition between the open state of FIG. 1 and a closed state shown in FIG. 3. In FIG. 3, cover 19 completely closes the access opening 77. When skillfully installed, cover 19 is essentially coplanar with trim ring 13. A skillful installer bonds mounting plate 21 to the exterior surface surrounding an opening in wall 55, and blends the mounting plate 21 to create the appearance of coplanarity with the surrounding wall 55 surface.

Accessory 10 preferably includes a detent or retention mechanism that holds cover 19 closed as shown in FIG. 3. The preferred embodiment allows cover 19 to swing to the open position of FIG. 1 from the closed position of FIG. 3 when cover 19 is pressed inwards toward element 16, and then pushed to the side. Cover 19 preferably comprises relatively rigid flat metal or hard plastic. As will be explained below, some deflection of cover 19 is preferable to improve manufacturability.

Figure 5:
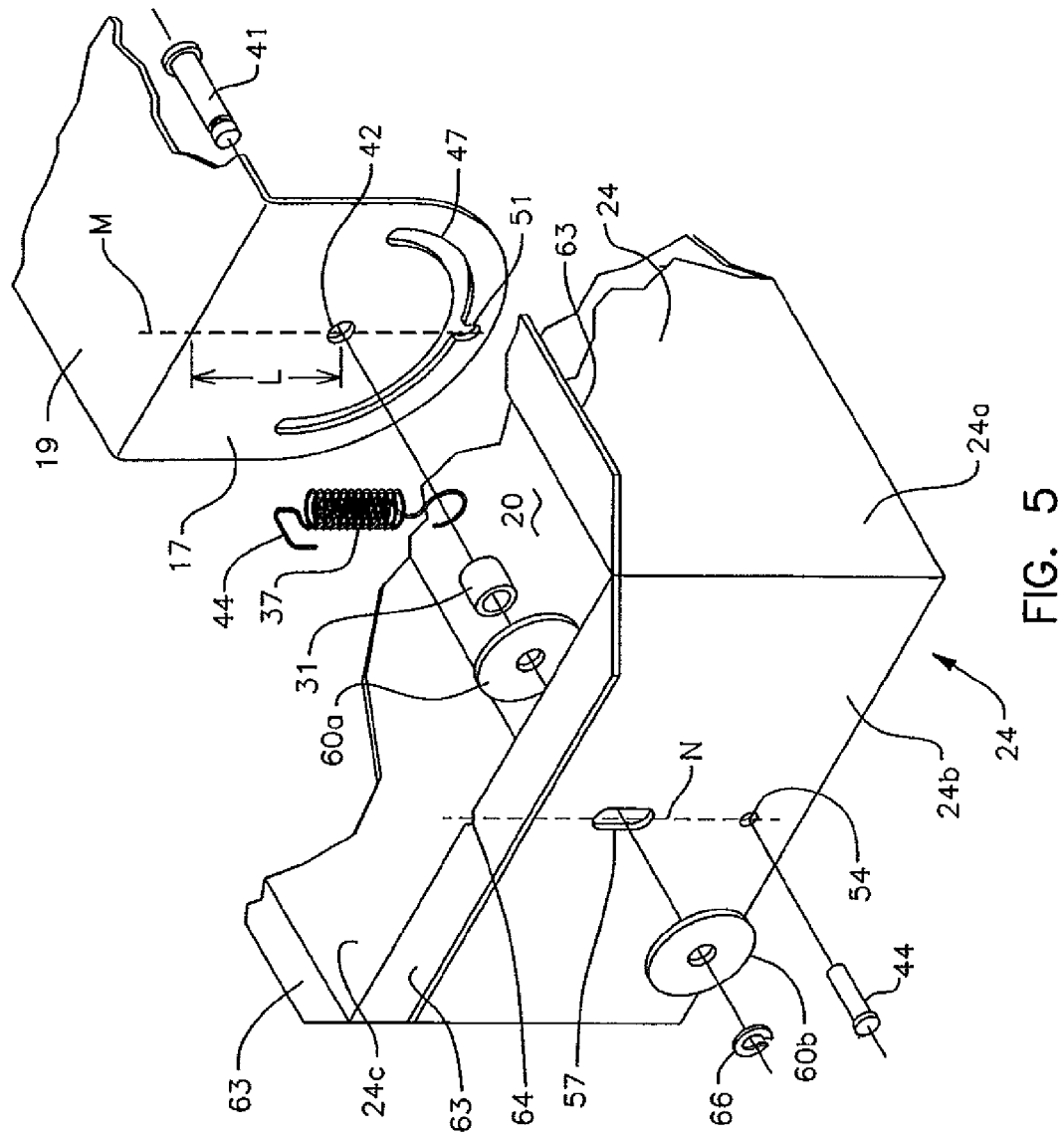
FIG. 5 is an exploded perspective view of a portion of the mechanism for guiding and supporting the cover.

FIGS. 4-6 show details of a preferred mechanism 20 for supporting and positioning cover 19. FIGS. 5-6 do not show trim plate 13.

Mechanism 20 is contained for the most part within a housing 24 having first through fourth walls 24a, 24b, 24c, and 24d. Walls 24b and 24d are of the same size and preferably somewhat shorter than walls 24a and 24c. Walls 24a and 24c are also of substantially the same size. Walls 24a-24d define a cylindrical rectangular space that for the purposes of this invention, is substantially rigid. In one preferred embodiment, walls 24a-24d are integral.

Flanges 63 project at right angles outwardly from walls 24a-24d and further define the first (access) opening 77 in housing 24 that cover 19 closes and trim plate 13 frames. Flanges 63 are intended to press against visible surfaces of wall 55 when accessory 10 is installed. Flanges 63 attach to mounting plate 21 by some means such as spot welding.

As mentioned, plate 21 is affixed to wall 55 by means such as wallboard mud or plaster. Plate 21 is typically quite thin, perhaps on the order of 0.02 in. or so. When skillfully done, trim plate 13 and cover 19 are essentially coplanar with built up filler material on plate 21. Properly painting plate 13 and cover 19 can match them to wall 55 and render them very unobtrusive to the casual gaze.

Walls 24b and 24d each have a housing pivot feature comprising in this embodiment a slotted hole 57. Of course a preferred type of such an embodiment will have a similar hole 57 in wall 24d as well, as FIG. 10 suggests.

A pair of arms 17 sized to fit within housing 24 support and carry cover 19. Arms 17 attach at first ends thereof to opposing edges of cover 19 and project at right angles thereto, terminating at second ends. Each arm 17 carries an axle or shaft 41 at a point spaced a predetermined distance L from cover 19 (FIG. 5).

In the preferred embodiment shown, axle 41 fits through hole 42 and is welded or otherwise rigidly attached to arm 17 at that point so that axle 41 rigidly projects perpendicularly from arm 17. Axle 41 then fits through in order, a bushing 31, a first washer 60a, elongate hole 57, and a second washer 60b external to housing 24. A C clip 66 or other retainer secures axle 41 in slotted hole 57. Axles 41 and arms 17 can thus rotate with respect to housing 24. Washers 60a and 60b serve to retain axles 41 within slots 57 and prevent clips 66 from binding or catching in elongate holes 57.

Each hole 57 lies on a line N (FIG. 5) midway between walls 24a and 24c and perpendicular to the intersection line between flange 63 and wall 24b or 24d. Hole 57 is oriented with its long or major axis aligned with line N. The end of elongate hole 57 closer to flange 63 should be spaced therefrom by approximately the distance L.

Each arm 17 has near the second end thereof, a slot 47 in the form of a circular arc centered on axle 47 and defined by first and second edges. The first edge of slot 47 is relatively closer to axle 41 than the second edge. Slot 47 must subtend at least 90°, extending from a point spaced approximately the distance L from cover 19 to a point approximately 2L from cover 19 and in alignment with line M. Line M is perpendicular to cover 19 and passes through the center of axle 41. In the embodiment shown, slot 47 in fact subtends 180°, allowing cover 19 to swing either to a right or left outlet 16 access position.

Each arm 17 has a radially oriented notch 51 aligned with line M and intersecting the second edge of slot 47. Notch 51 forms an engagement feature on arm 17.

Each of walls 24b and 24d has a pin 44 rigidly fastened (by staking for example) in a hole 54 in each of the walls 24b and 24d. Hole 54 is aligned with line N and spaced approximately 2L from flange 63. Each pin 44 projects through the adjacent circular slot 47, 47, thereby forming a detent or retention feature projecting from wall 24b or 24d. The distance between the bottom end of notch 51 and the surface of cover 19 should slightly exceed the distance between pin 44 and flange 63.

A pair of tension springs 37 connects between an attachment point 64 on each of walls 24b and 24d, and the corresponding bushing 31. Springs 37 should constantly generate force urging axles 41 toward flanges 63 and opening 77. This force urges cover 19 into co-planar alignment with mounting plate 21. The force that springs 37 collectively generate should be easily overcome by a person when pressing on cover 19, perhaps in the range of 0.5-1 lb.

The configuration shown for springs 37 is representative only. A number of options, torsion springs rather than extension springs 37 for example, can provide alignment force on axles 41.

In an assembled mechanism 20, pins 44 project into slots 47. When cover 19 is rotated to either of the positions shown in FIGS. 1 and 2, pins 44 are spaced from notches 51 within slots 47. When cover 19 is in the position that FIG. 1 shows, a user can access outlet 16 through opening 17. When cover 19 is rotated to the position of FIG. 3 completely within opening 77, cover closes opening 77. When cover 19 is in the closed position, pins 44 align with, and the force of springs 37 engage, notches 51.

The preferred dimensional relationships specified above allow springs 37 to urge cover 19 into appropriate co-planarity with flanges 63 and trim plate 13 when cover 19 is in its closed position, as FIG. 3 shows. Pins 44 cooperate with notches 51 to form a detent mechanism to retain cover 19 in the closed position of FIG. 3.

A user can access outlet 16 by pressing cover 19 into the wall to free notches 51 from pins 44. Once pins 44 are freed of notches 51, cover 19 can be easily rotated through the partially open position of FIG. 2 to the fully open position of FIG. 1, allowing access to outlet 16.

One might think that axles 41 must be fixed in arms 17 after the cover/arm assembly has been aligned within housing 24. Selecting cover 19 from an appropriate material and with an appropriate thickness avoids this need. A cover 19 made from sufficiently resilient and thin sheet material can be elastically bent an amount sufficient to allow both axles 41 to be inserted into their respective holes 57 during an assembly process, and both pins 44 to fit into their respective slots 47. Allowing cover 19 to then return to its unstressed flat shape leaves both axles 41 properly positioned within their respective holes 57. Attaching clips 66 then solidly locks axles 41 in holes 57 to prevent axles 41 from disengaging with holes 57.

FIGS. 6 and 7 suggest a preferred way in which the arm/cover assembly is fabricated. A blank is stamped from sheet steel to form the intermediate structure shown in FIG. 7. This structure is then bent into the final shape shown in FIG. 6. Axles 41 are mounted into arms 17 after the structure of FIG. 7 is bent into the shape of FIG. 6 and positioned within housing 24.

Figure 8:
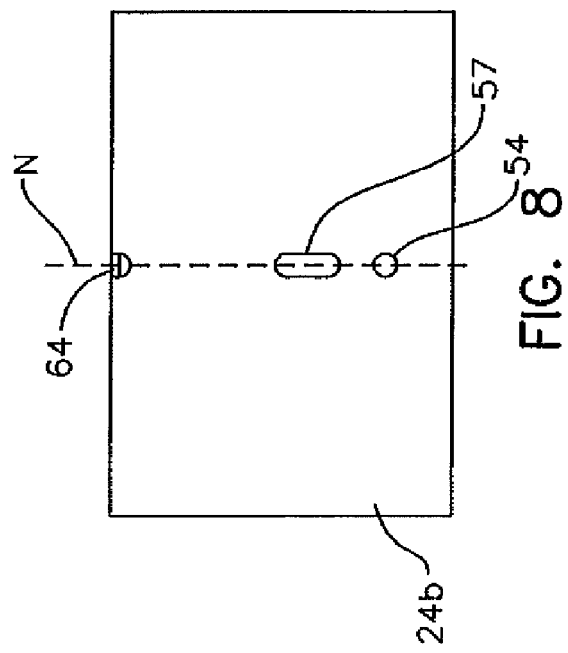
FIG. 8 is an elevation view of an end wall to which a portion of the mechanism of FIG. 4 attaches.

FIG. 8 shows an elevation view of wall 24b. FIGS. 5 and 8 show the relative positions of slotted hole 57, hole 54 for receiving projection 44, attachment point 64, and line N.

Figure 9:
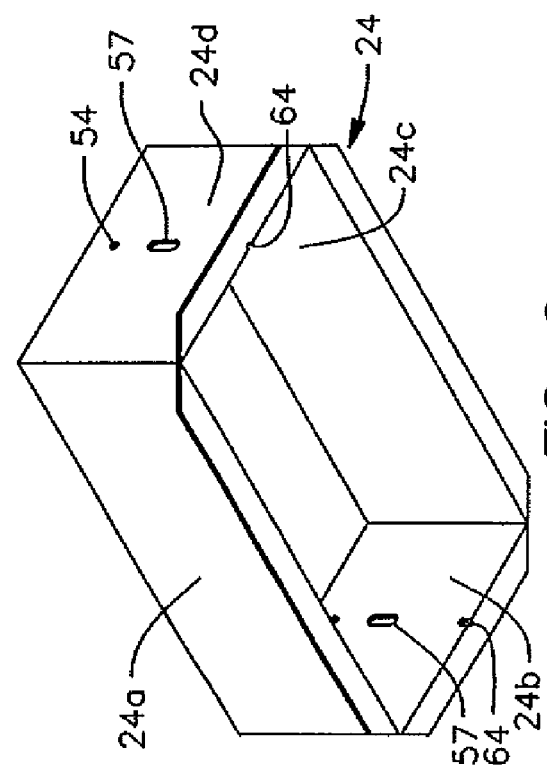
FIG. 9 is a perspective view of a housing for the mechanism of FIG. 4.
Figure 10:
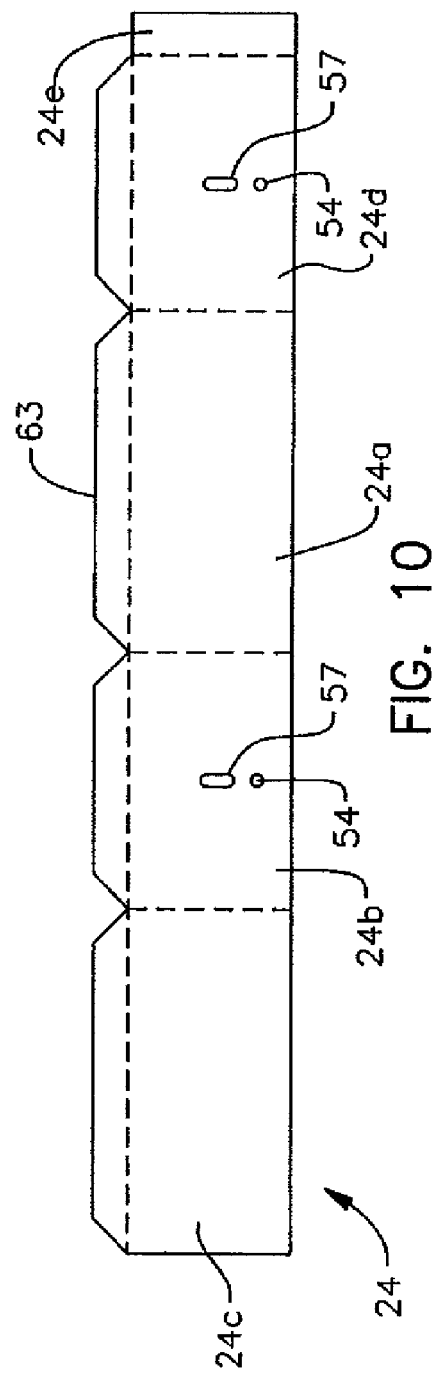
FIG. 10 shows a preliminary phase of sheet metal to be formed into the housing.

FIG. 10 shows an intermediate phase in the construction of a housing 24 shown in FIG. 9. FIG. 10 may be formed by stamping from a steel sheet. Fold lines are shown dotted in FIG. 10. Tab 24e is spot welded to wall 24c after bending to form the finished housing 24.

Figure 11:
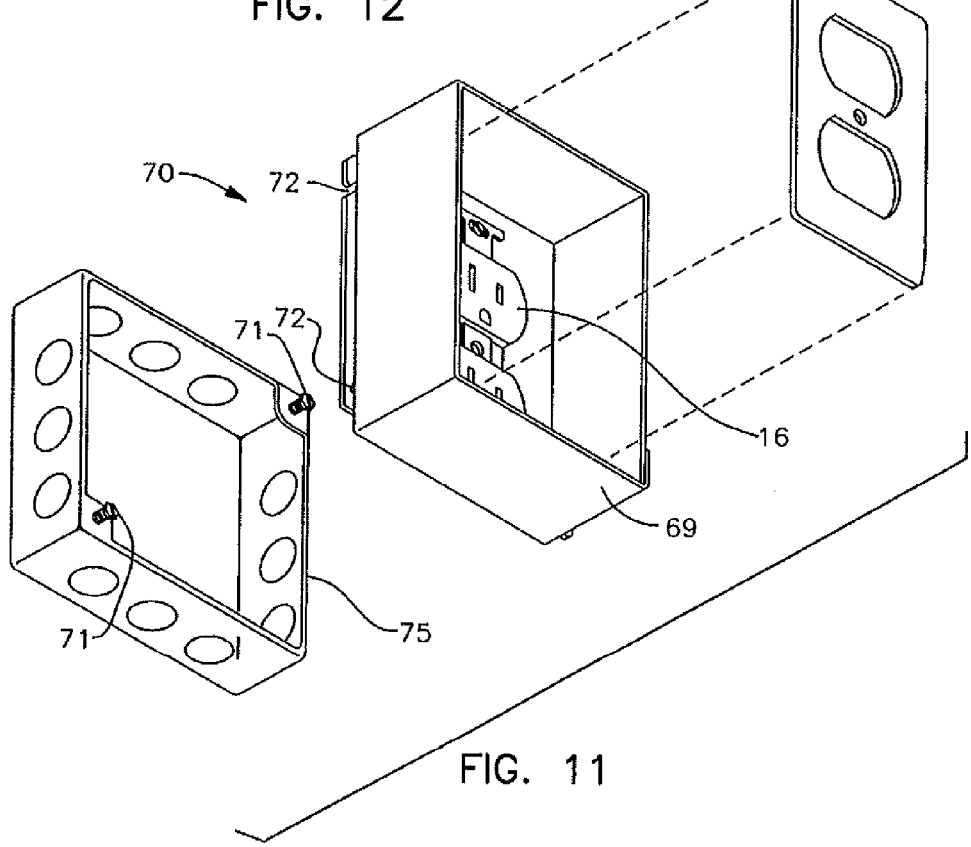
FIG. 11 is an exploded perspective view of the components for holding the outlet and with which the invention is intended to cooperate.

FIG. 11 shows an exploded perspective view of an outlet housing 70. Conventional electrical box 75 mounts on a building stud. A specially designed adapter box 69 attaches to box 75 with standard slotted machine screws 71 fitting in slots 72 in the conventional manner. Outlet 16 mounts within adapter box 69 with cover plate 18 overlaying the volume within which connections to outlet 16 are made. With outlet 16 so mounted, accessory 10 does not is completely compatible with existing electrical codes.

Two sides of adapter box 69 are shown on edge in FIG. 4. Adapter box 69 is sized to telescopically receive housing 24 with small clearances on all four sides. Accessory 10 must be placed in aligned juxtaposition on wall 55 with respect to adapter box 69 so that housing 24 fits within adapter box 69 without binding by accessory 10. In most cases, the hole in wall 55 is cut after wall 55 is permanently attached to the mounting studs. Accessory 10 is then inserted into the hole in wall 55 and bonded to wall 55 with the appropriate aligned juxtaposition.

Figure 12:
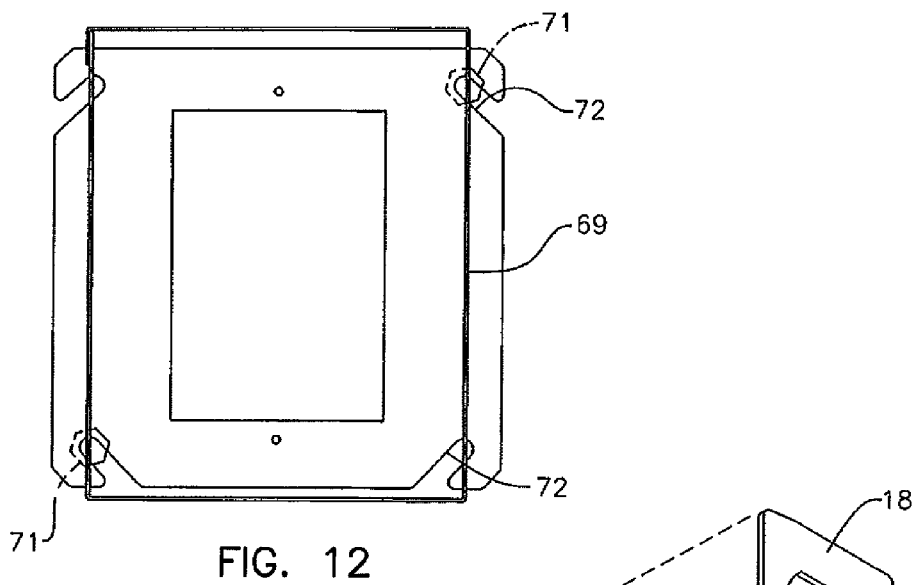
FIG. 12 is a front elevation view of an adapter sleeve for mounting on a standard electrical box.

FIG. 12 is a front elevation view of adapter box 69. The conventional form of slots 72 is clearly visible.

What I claim is:

1. An improved electrical outlet access control accessory for mounting in a wall having a visible surface and an opening therein, to provide access to and concealment for an electrical outlet mounted in aligned juxtaposition to the wall opening and recessed within the wall, comprising:
   a) a housing having i) an internal space and first and second openings, said internal space and openings defined by first and second facing walls and third and fourth facing walls adjacent and attached to the first and second walls, and ii) a first housing pivot on the first wall and within the housing, said housing pivot spaced from the housing opening;
   b) a cover sized to fit within the first housing opening; and
   c) a first arm sized to fit within the housing, and attached at a first end to the cover proximate an edge thereof, and to an arm pivot spaced from the first end of the first arm, said arm pivot attached for rotation to the first housing pivot, to allow the first arm to rotate and shift the cover between an open position within the housing's internal space and a closed position placing the cover within the first housing opening and in substantial alignment with the visible surface of the wall, said open and closed cover positions respectively allowing access to and concealment for the outlet.

2. The accessory of claim 1, wherein the housing includes a second housing pivot point on the second wall between the internal mounting feature and the opening, and further comprises a second arm sized to fit within the housing, and attached at a first end to the cover proximate an edge thereof, and an arm pivot point proximate a second end of the second arm attached for rotation to the second housing pivot point, to allow the second arm to rotate with the first arm and shift the cover between the open position and the closed position.

3. The accessory of claim 1, wherein the first and second walls of the housing are of substantially similar size and are smaller than the third and fourth walls, said third and fourth walls are also of substantially similar size, and wherein the housing and arm pivot points collectively comprise an axle fixed to one of the first arm and the first wall, and rotating in a hole in the other of the first arm and the first wall, and wherein the outlet has a longitudinal axis oriented substantially parallel to the third and fourth walls.

4. The accessory of claim 3, wherein the axle is fixed to the first arm and the hole is in the first wall, wherein the first wall includes a detent feature and wherein the first arm includes an engagement feature engaging the detent feature as the cover approaches the closed position.

5. The accessory of claim 4 wherein the hole in the first wall comprises a slot through which the axle passes; wherein the detent feature comprises a detent projection fixed in the first wall at a preselected spacing from the pivot point; and wherein the engagement feature in the first arm comprises a circular slot having first and second edges with radii respectively larger and smaller than the preselected spacing and centered on the axle, said slot having a radially oriented notch in the first edge; and including a spring attached to the axle urging the notch toward the detent projection.

6. The accessory of claim 5, wherein the spring is attached between the axle and the housing.

7. The accessory of claim 6, wherein the cover and the first arm are integral.

8. The accessory of claim 7, including first and second arms, both integral with the cover, and at opposite ends thereof.

9. The accessory of claim 5, wherein the dimensions of the cover are substantially equal to the dimensions of the housing's opening.

10. The accessory of claim 3, including first and second arms both integral with the cover, and at opposite ends thereof.

11. The accessory of claim 10, wherein the first and second arms and the cover comprise elastic material of a predetermined thickness, said material and thickness allowing a predetermined amount of elastic bending of the cover.

* * * * *